United States Patent
Hutts et al.

(10) Patent No.: US 8,728,601 B2
(45) Date of Patent: May 20, 2014

(54) PREFORM AND CONTAINER COMPRISING REINFORCING ELEMENTS

(75) Inventors: David Jerome Hutts, Fort Worth, TX (US); Eric Didier, Remoncourt (FR); Eric Lupke, Nancy (FR)

(73) Assignee: Nestec S.A., Vevey (CH)

( * ) Notice: Subject to any disclaimer, the term of this patent is extended or adjusted under 35 U.S.C. 154(b) by 12 days.

(21) Appl. No.: 13/508,489

(22) PCT Filed: Nov. 6, 2009

(86) PCT No.: PCT/US2009/063536
§ 371 (c)(1),
(2), (4) Date: Aug. 24, 2012

(87) PCT Pub. No.: WO2011/056176
PCT Pub. Date: May 12, 2011

(65) Prior Publication Data
US 2013/0004692 A1    Jan. 3, 2013

(51) Int. Cl.
*B29D 22/00* (2006.01)
*B65B 1/44* (2006.01)
*B29B 11/04* (2006.01)
*B29B 11/08* (2006.01)

(52) U.S. Cl.
CPC . *B65B 1/44* (2013.01); *B29B 11/04* (2013.01); *B29K 2023/06* (2013.01); *B29B 11/08* (2013.01)
USPC ............................. 428/36.92; 428/542.8

(58) Field of Classification Search
USPC ............................. 428/36.92, 542.8
See application file for complete search history.

(56) References Cited

U.S. PATENT DOCUMENTS

| | | | | |
|---|---|---|---|---|
| 4,320,083 A * | 3/1982 | Jakobsen | ............... | 264/531 |
| 4,337,286 A * | 6/1982 | Schiemann | ............... | 428/36.92 |
| 4,359,165 A * | 11/1982 | Jakobsen | ............... | 215/382 |
| 4,620,639 A * | 11/1986 | Yoshino | ............... | 215/373 |
| 4,997,005 A * | 3/1991 | Pawelzik et al. | ............... | 137/625.17 |
| 5,126,177 A * | 6/1992 | Stenger | ............... | 428/36.92 |
| 5,366,776 A * | 11/1994 | Mertens | ............... | 428/41.6 |
| 5,688,370 A * | 11/1997 | Hagen et al. | ............... | 162/146 |
| 5,894,041 A * | 4/1999 | Cornell | ............... | 428/35.7 |
| 7,651,781 B2 | 1/2010 | Richards et al. | ............... | 428/542.8 |
| 7,976,767 B2 * | 7/2011 | Ungrady et al. | ............... | 264/535 |

FOREIGN PATENT DOCUMENTS

| | | |
|---|---|---|
| FR | 2724588 | 3/1996 |
| GB | 2015914 | 9/1979 |
| JP | 55-71244 | 5/1980 |
| JP | 62-144612 | 9/1987 |
| JP | 10338220 | 12/1998 |
| WO | 03055663 | 7/2003 |
| WO | 2007147038 | 12/2007 |

OTHER PUBLICATIONS

International Search Report—PCT/US2009/063536 mailing date Jul. 29, 2010, 5 pages.
Written Opinion of the International Searching Authority—PCT/US2009/063536 mailing date Jul. 29, 2010, 8 pages.

* cited by examiner

*Primary Examiner* — N. Edwards
(74) *Attorney, Agent, or Firm* — K&L Gates LLP

(57) ABSTRACT

The present invention relates to a plastic preform (1) for a container comprising at least one elongate protrusion (10, 12, 13, 14, 15) and/or groove (20), which is obtained by injection molding. The present invention further relates to a container blow-molded from such a preform comprising at least one longitudinal protrusion (32, 33, 34) and/or groove and having a continuous inner and outer surface.

12 Claims, 14 Drawing Sheets

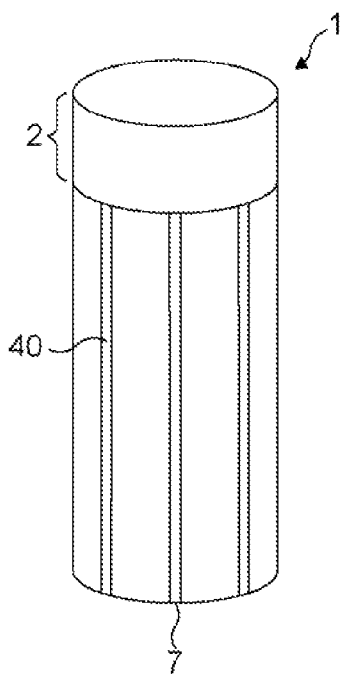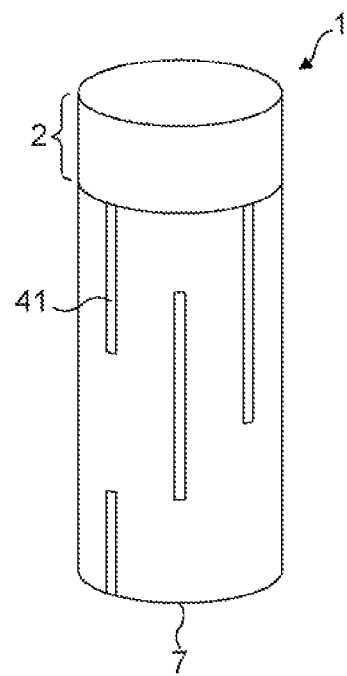
FIG. 20a  FIG. 20b
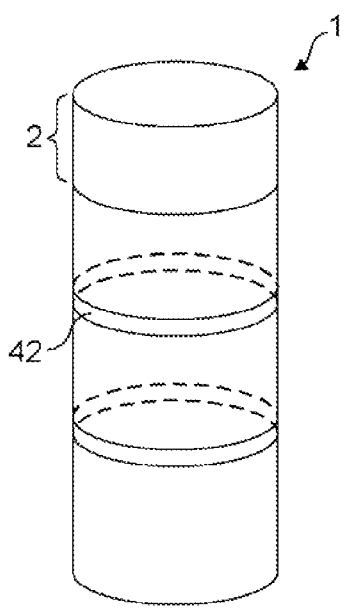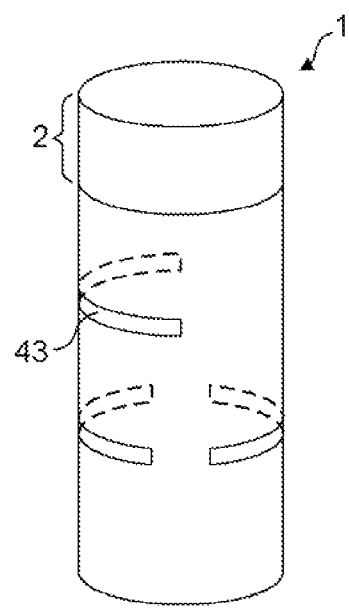
FIG. 20c  FIG. 20d

PREFORM AND CONTAINER COMPRISING REINFORCING ELEMENTS

CROSS REFERENCE TO RELATED APPLICATIONS

The present application is a National Stage of International Application No. PCT/US2009/063536, filed on Nov. 6, 2009, the entire contents of which are being incorporated herein by reference.

FIELD OF THE INVENTION

The present invention relates to a preform and a container with reinforcing elements. Specifically, the present invention relates to the field of providing protrusions and/or grooves in a preform and a container.

BACKGROUND OF THE INVENTION

The process of producing for example bottles for beverages includes injection-molding of a preform and blow-molding of the container is known in prior art. A major task within this field is to decrease the weight of the final container thereby maintaining the same filling volume. These light-weighting containers however come to their limits when the mechanical performance of the empty or filled container is negatively influenced, which makes the handling of the container in the production line and later during storage and transport more difficult or even impossible. The containers can deform or even get broken due to the external load, if the containers are not designed to withstand the external forces.

A further problem with light-weighting containers arises when the container is filled with fluids under pressure, e.g. with carbonated beverages. In this case the container still has to provide enough strength to withstand the internal pressure.

Thin and light-weighted containers which are blow-molded from a thin preform further pose problems during the production of the preform itself. During the injection-molding of the preform the material is injected into the mold from the end cap, so that the material flows along the full preform length before forming the neck part. However, this requires a minimum wall thickness of the preform to allow the material to flow through the mold to fill the neck part.

It is therefore the object of the present invention to improve the prior art.

Specifically it is an object of the present invention to provide preforms and containers having less weight and thinner walls, but at the same time providing the required strength to withstand external load as well as internal pressure.

This object is solved by the independent claims. Further features and embodiments are subject matter of the dependent claims.

BRIEF DESCRIPTION OF THE DRAWINGS

Additional features and advantages of the present invention are described in, and will be apparent from, the description of the presently preferred embodiments which are set out below with reference to the drawings in which:

FIGS. 20A to 20D show different embodiments of positioning the ribs on the preform according to the present invention;

DETAILED DESCRIPTION OF THE INVENTION

Figure 1A:
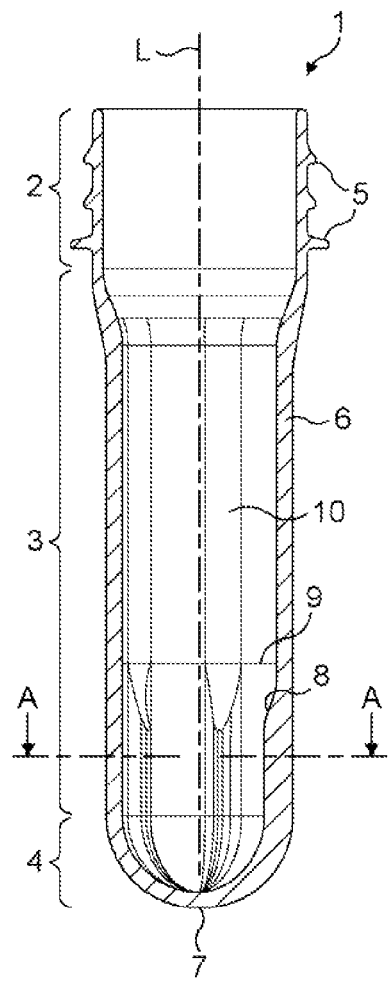
FIG. 1A shows a vertical cross-section and FIG. 1B shows a horizontal cross-section of a first embodiment of a preform according to the present invention.

The present invention generally relates to a plastic preform for a container comprising at least one protrusion and/or groove. In other words, the present invention relates to a preform comprising at least one reinforcing element. The reinforcing elements have an elongate or longish shape and are extending in any linear direction of the preform.

More generally speaking, the preform according to the present invention has variable wall thicknesses thereby providing a structure with elongate strengthening elements. The preform according to the present invention comprises elongate or linear protrusions and/or recesses.

Preferably the preform according to the present invention has a substantially constant wall thickness and has one or more ribs extending inside and/or outside the preform. The ribs, grooves or the reinforcing elements on the outside wall can extend in a vertical, horizontal, diagonal or any other direction or into different directions being a combination of the before-mentioned possibilities. The ribs, grooves or reinforcing elements on the outside wall extend in a vertical direction.

For a preform with protrusions according to the present invention less material can be used, since the protrusions allow to provide thinner walls compared with standard preforms.

Further, with the preforms according to the present invention the problems with thin walled preforms during the injection-molding can be solved. When using preforms having ribs according to the present invention, a preform with thinner wall can be produced industrially as the material during the injection-molding can easily flow through the ribs to fill the neck part. As a consequence, the amount of material to produce a good looking slim container from the preform with sufficient mechanical properties is significantly decreased.

According to the present invention from the inventive preforms containers can be produced being light-weighted and having thinner walls, but at the same time having an improved strength with respect to top-load and/or internal pressure.

The container thereby has several improvements compared to prior art containers. Usually, when using a standard preform without ribs during the blow-molding reinforcement, ribs are added in the blow-mold to provide a container with improved strength. Such added ribs however result in an interrupted exterior surface of the container, which is not desirable from an aesthetic point of view. Further, with this method only outside ribs can be provided.

This problem is also overcome by the present invention. Since the bottle is blow-molded from a preform having already ribs provided, the resulting shape of the bottle will be substantially continuous and smooth. Further, in order to completely avoid any external ribs, with the present invention only ribs on the inside can be provided. This is not possible with the prior art addition of reinforcement ribs which can only be added to the outside of the container.

The container according to the present invention is preferably a bottle, into which different kinds of fluids can be filled. Examples of such fluids are beverages, e.g. water, juices or carbonated beverages.

In the following, the present invention will be explained in more detail with reference to the enclosed drawings.

FIG. 1A shows a vertical cross-section of a first embodiment of a preform 1 according to the present invention. Generally, a preform 1 comprises a neck portion 2 or thread portion, an intermediate portion 3 and a body portion 4. Depending on the type of closure used for the final container, the neck portion 2 can comprise one or more protruding parts 5 which allow to attach the cap to the final container. The neck portion 2 during the blow-molding process remains unchanged.

The intermediate portion 3 and the body portion 4 during the blow-molding will be stretched to the shape of the final container.

As shown in FIG. 1A the preform 1 comprises side wall 6 extending from the neck portion 2 to the body portion 4 and forming the bottom 7 of the preform 1.

In the present specification when the term "vertical" or "longitudinal" is used, then it is intended to describe a direction extending in a direction parallel to the longitudinal axis L of the preform. In other words, this describes a direction from the bottom portion 4 to the neck portion 2.

Likewise, in case that in the present specification the term "horizontal" or "circumferential" is used, it is intended to describe a direction being orthogonal to the vertical direction, thus extending along a circumferential direction of the side wall 6 or parallel to the neck portion 2 of the preform 1.

The preform 1 according to the first embodiment comprises several ribs 10 extending in a vertical direction from a middle part 9 of the intermediate portion 3 to the bottom 7. The ribs 10 do not begin right below the neck portion 2, but their end is spaced apart from the neck portion 2 and begins within the intermediate portion 3. They are extending along at least a part of the length of the side wall 6 and join each other at the central point of the bottom 7.

As shown in the cross-section in FIG. 1A, the preform in this embodiment can have a step 8, i.e. an increase in thickness of the side wall 6 along the vertical direction, so that the side wall 6 near the neck portion 2 is thinner than the side wall 6 near the body portion 4.

However, the present invention also comprises preforms without steps having a substantially constant thickness of the side wall 6. Further, it is to be noted that even though in the following description the term "ribs" is used, the present invention is not limited to ribs but can encompass any other type of elongate protrusion. The elongate protrusions serve as reinforcing elements.

Figure 1B:
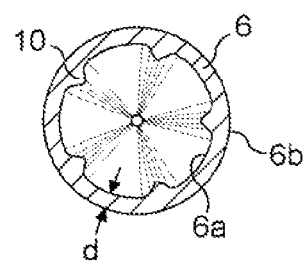

FIG. 1B shows a cross-section of the preform 1 as shown in FIG. 1A along the line indicated by arrows A. As can be seen the preform 1 along a horizontal circumferential line comprises a substantially constant thickness d of the side wall 6 and only at several points comprises inner ribs 10 protruding from the inside surface 6a of the side wall 6. On the outer surface 6b in the present embodiment there are provided no ribs.

In the specific embodiment as shown in FIGS. 1A and 1B the ribs have a substantially triangular cross-section.

The triangular inner ribs 10 thus provide a selective thickening of the side wall 6 of the preform 1. With these reinforcing elements the thickness of the sidewall 6 at the portions with no ribs can be made thinner than compared to standard preforms. More concretely, standard preforms usually have a wall thickness of at least 2.2 mm. With the present invention a lower wall thickness becomes possible, since on one hand the strength of the preform 1 and the final container is ensured by the reinforcing elements and on the other hand the injection molding of a thin-walled preform, as previously explained, becomes only possible if the material can flow through the mold along the ribs.

Figure 2A:
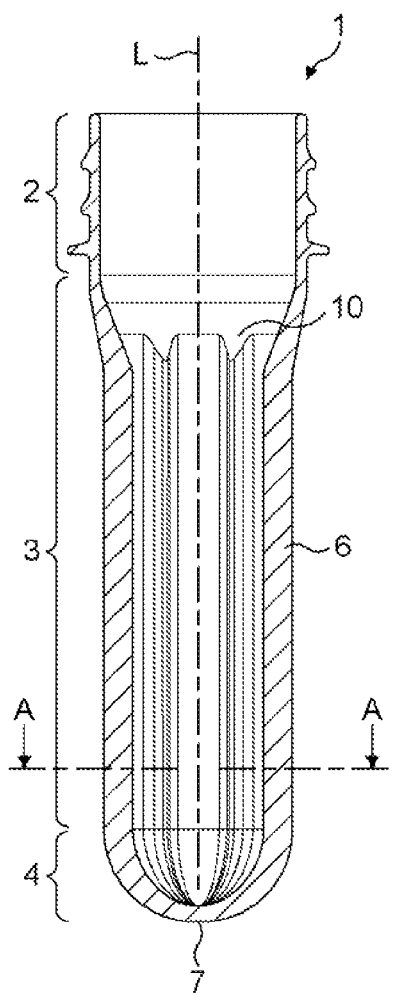
FIG. 2a shows a vertical cross-section and FIG. 2B shows a horizontal cross-section of a second embodiment of a preform according to the present invention.

A second embodiment will be explained with reference to FIGS. 2A and 2B. Again FIG. 2A shows a vertical cross-section of the preform 1 and FIG. 2B shows a horizontal cross-section of the preform 1 as shown in FIG. 2A along the line indicated by arrows A.

The different parts of the preform are identical to the preform according to the first embodiment as shown in FIG. 1. However, is the length of the ribs is increased with respect to the preform as shown in FIG. 1, so that the ribs extend along the complete sidewall from the neck portion 2 to the bottom 7 As can be seen in FIG. 2B the wall 6 again comprises a substantially constant thickness d and a plurality of ribs 10 are protruding from the inside surface 6a of the side wall 6. The outer surface 6b of the side wall has no ribs.

Figure 2B:
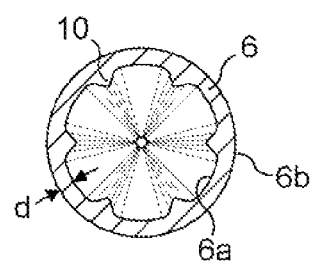

The ribs as shown in FIGS. 1B and 2B have an equal distance between each other but it is also possible to provide ribs having different distances to each other. The number of ribs can be one, two or even more for example up to several hundred ribs depending on the type of final container.

Figure 3A:
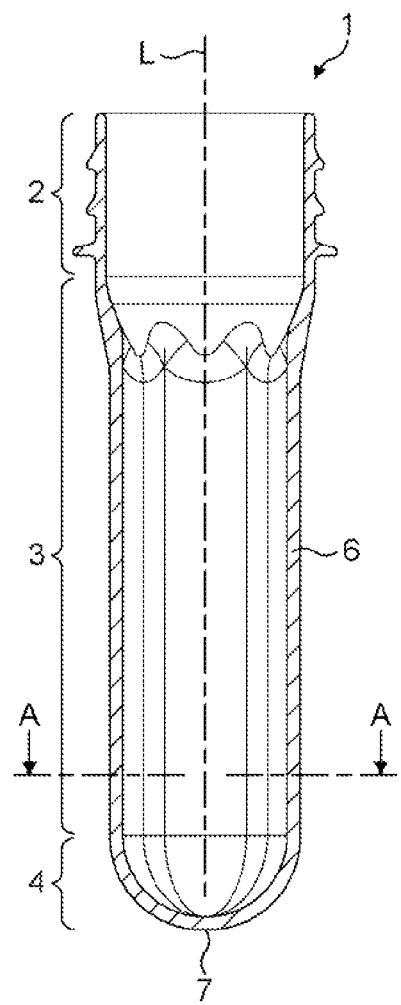
FIG. 3A shows a vertical cross-section and FIG. 3B shows a horizontal cross-section of a third embodiment of a preform according to the present invention.
Figure 3B:
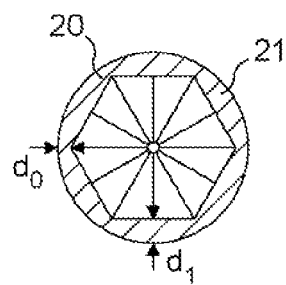

FIGS. 3A and 3B again show a vertical cross-section and a horizontal cross-section through a third embodiment of a preform 1 according to the present invention.

In this preform there is not provided a substantially constant thickness of the side wall 6, but a rather constantly varying thickness of the side wall 6 is provided. Hereby, the thickness of the side wall 6 along the vertical direction is always constant but varying along the horizontal direction of the side wall. As can be seen from FIG. 3B there are provided grooves or recesses 20 having a minimum wall thickness d0 of the side wall 6. Between every two grooves 2 there is provided a maximum thickness portion 21 having the maximum thickness d1. The wall thickness of the side wall 6 is hereby constantly increasing or decreasing between the grooves 20 and the maximum thickness portions 21.

In this way the preform comprises vertical reinforcing elements or in other words comprises elongate parts of different wall thicknesses extending along a vertical direction.

Figure 4A:
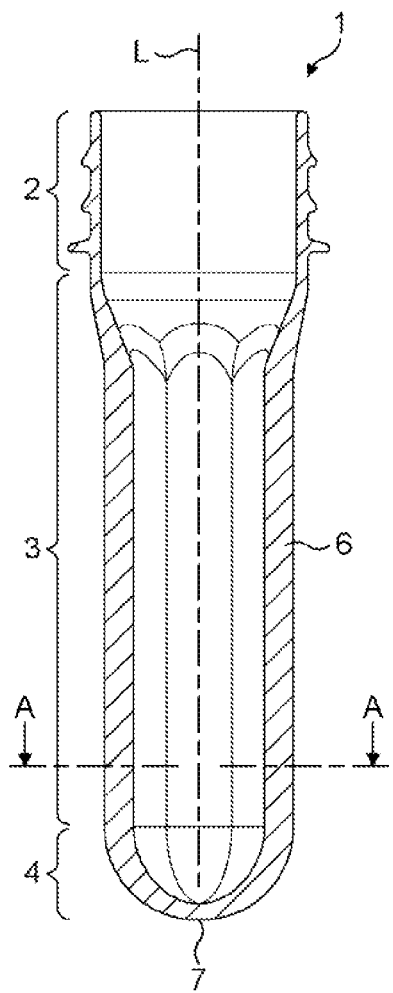
FIG. 4A shows a vertical cross-section and FIG. 4B shows a horizontal cross-section of a fourth embodiment of a preform according to the present invention.
Figure 4B:
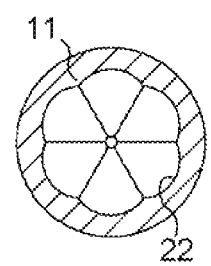

FIGS. 4A and 4B show a fourth embodiment of a preform according to the present invention. Like in the embodiment shown in FIGS. 3A and 3B in this fourth embodiment the thickness of the side wall 6 along a horizontal direction is varying. Hereby, again, grooves or recesses 22 are provided having a minimum wall thickness and protrusions or ribs 11 are provided having maximum wall thickness.

Between every two recesses 22 a protrusion 11 is provided. The wall thickness of the sidewall 6 in contrast to the third embodiment is not constantly decreasing and increasing, but increases with a higher rate next to the protrusions or in other words increases with a lower rate next to the recesses 22. Thereby the recesses have a roundish or concave shape.

Figure 5:
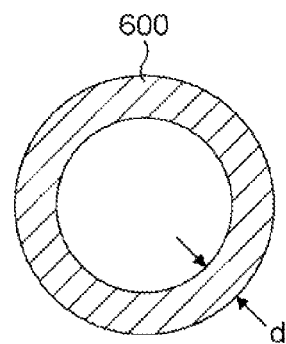
FIG. 5 shows a horizontal cross-section of a preform according to prior art.

FIGS. 5 to 10 now explain several different positions and shapes of vertical ribs according to a preform 1 of the present invention. Each of FIGS. 5 to 10 shows a cross-section of a preform 1. Hereby, for a better explanation FIG. 5 shows a cross-section of a preform according to prior art.

As can be seen from FIG. 5 the preform according to prior art has a side wall 600 having a constant wall thickness d and no ribs and/or grooves.

Figure 6:
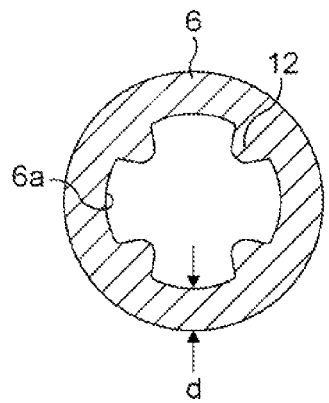
FIGS. 6 to 10 show horizontal cross-sections of different preforms according to the present invention.

FIG. 6 shows a cross-section of a preform having a substantially constant thickness d of the side wall 6 along a horizontal direction and having ribs 12 on the inside surface of the side wall 6. In the embodiment shown in FIG. 6 there are provided four inside ribs with constant distance to each other and having a cross-section of a triangle with rounded top corner.

Figure 7:
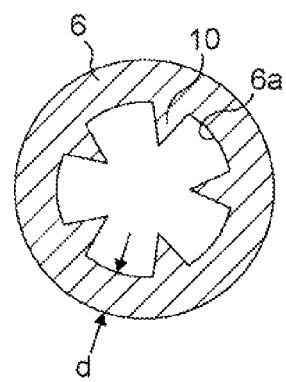

FIG. 7 shows an embodiment where again the preform has a substantially constant wall thickness d of the side wall 6 and where five ribs 10 are provided on the inside surface 6a of the preform. The ribs 10 in this embodiment have a substantially triangular cross-section.

Figure 8:
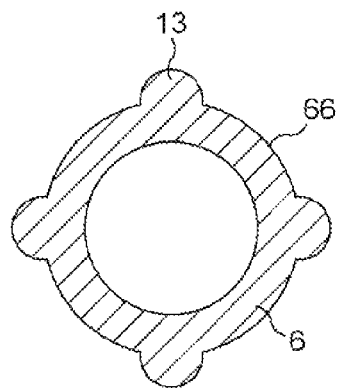
Figure 9:
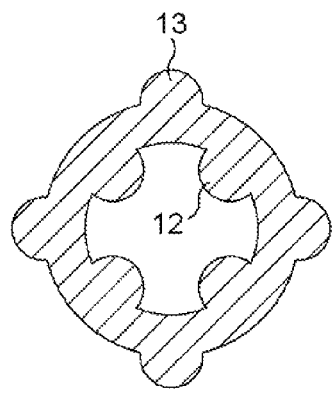
Figure 10:
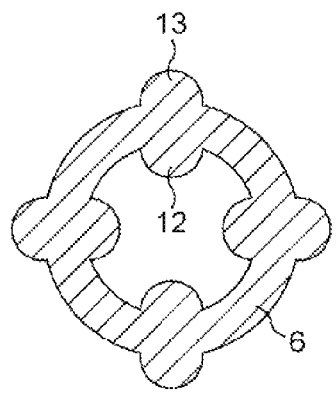

In the embodiments shown in FIGS. 8 to 10 cross-sections of preforms are shown having ribs 12, 13 with a cross-section of a half-circle. However, FIGS. 8 to 10 are intended to show different possible positions of the ribs and the present invention is not restricted to the specific cross-section of the shown ribs.

In FIG. 8 the ribs 13 are provided only on the outside surface 6b of the side wall 6.

In FIG. 9 inside ribs 12 as well outside ribs 13 are provided. In the embodiment shown in FIG. 9 an equal number of inside ribs 12 and outside ribs 13 is provided. Hereby, the inside ribs 12 and outside ribs 13 are offset to each other, so that on a position along the side wall 6 where there is provided an outside rib 13 no corresponding inside rib 12 is provided.

A further embodiment is shown in FIG. 10 where, as in FIG. 9, an equal number of inside ribs 12 and outside ribs 13 is provided. However, in this embodiment the ribs are not offset to each other but provided on opposed sides of the side wall 6.

Figure 11:
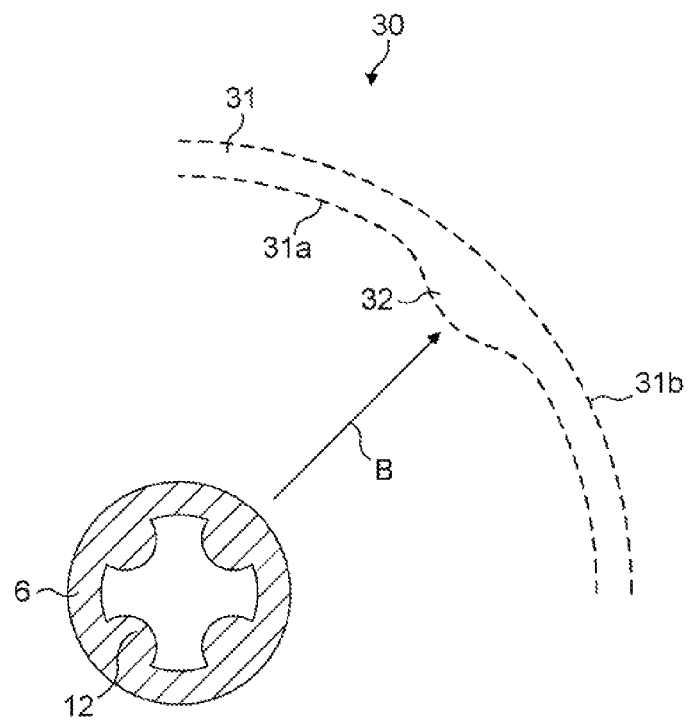
FIG. 11 shows a horizontal cross-section of a further embodiment of a preform and schematically the form of the resulting blow-moulded container.

FIG. 11 shows a cross-section of a preform having four inner ribs 12. Further shown in FIG. 11 is a part 30 of a final container which is blow-molded from the corresponding preform 1 having a configuration as shown in FIG. 11.

The part 30 of the final container is shown with dashed lines. As can be seen, the side wall 6 of the preform will result into a corresponding side wall 31 of the container. The side wall 31 also has an inner side 31a and an outer side 31b. The inner rib 12 of the preform will result in corresponding inner ribs 32 or protrusions or reinforcing elements in the final container. The transition from the inner rib 12 of the preform into the protrusion 32 of the final container is schematically indicated in FIG. 11 with an arrow B.

By using a preform having therein ribs, the surface of the final container will have a substantially continuous, i.e. a smooth shape. In other words, the surface of the container has no interruptions deriving from reinforcing or ornamental elements attached to the preform after producing the preform or attached to the container after blow-molding the container. This is schematically shown by the shape of the inner side 31a of the final container from which it can be seen that there is in fact a thickened portion which results from the inner rib 12, but it is smoothly integrated into the side wall 31 of the final container.

Figure 12:
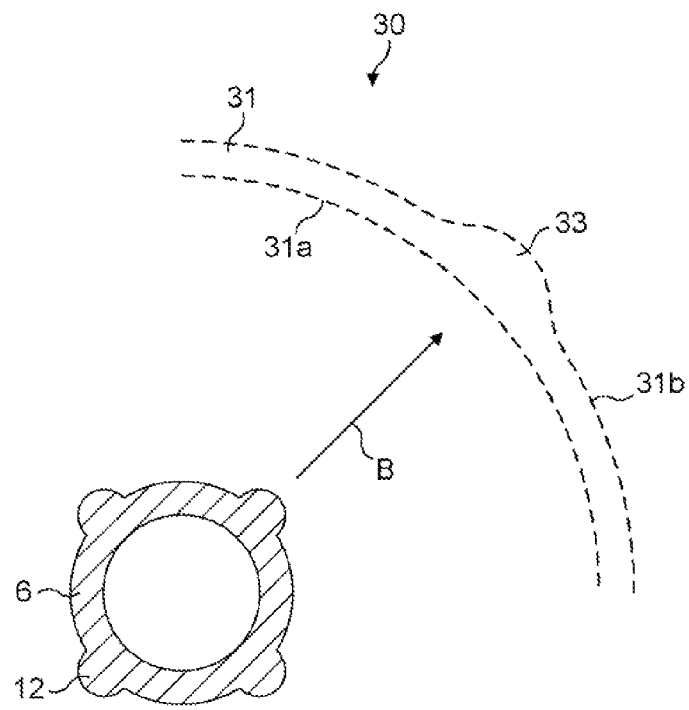
FIG. 12 shows a horizontal cross-section of a further embodiment of a preform and schematically the form of the resulting blow-moulded container.

The same configuration for the case of outer ribs 13 is shown in FIG. 12. Again a cross-section of a preform with four outer ribs 13 is shown. A part 30 of the final container is indicated by dashed lines. As can be seen the side wall 31 comprises an inner wall 31a being flat and an outer wall 31 having a smoothed rib or protrusion 33 resulting from the outer rib 13 of the preform. Thereby, the final container is strengthened.

The present invention so far has been explained with reference to preforms having vertical ribs and/or grooves.

Now several types of preforms having horizontal ribs and/or grooves will be explained.

Figure 13:
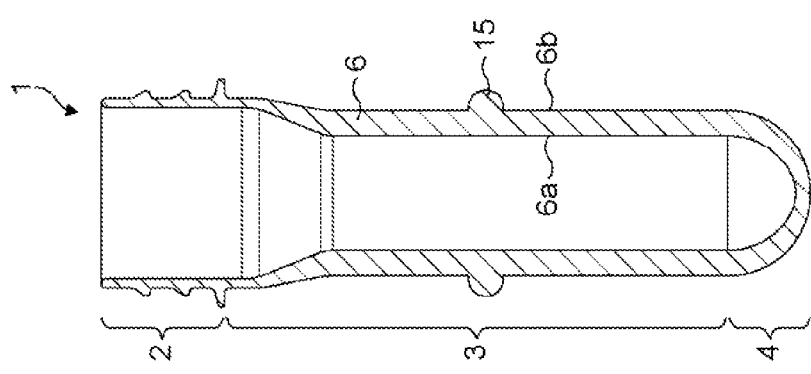
FIG. 13 shows a vertical cross-section of a fifth embodiment of a preform according to the present invention.

A preform according to a fifth embodiment is shown in FIG. 13.

According to this fifth embodiment of the preform 1 there are provided one or more horizontal ribs which can be circumferential or partially circumferential along the outer side of the side wall 6. In the embodiment shown in FIG. 7 there is provided one outer rib 15 having a cross-section of a half circle.

Figure 14:
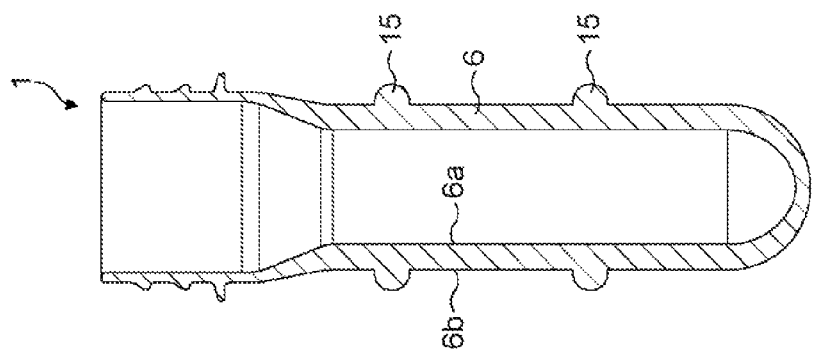
FIG. 14 shows a vertical cross-section of a sixth embodiment of a preform according to the present invention.

FIG. 14 shows a cross-section of a sixth embodiment of a preform 1 according to the present invention. In this embodiment also horizontal circumferential ribs are provided, whereby the ribs are two outer ribs 15 provided on the outside 6b of the side wall 6.

Figure 15:
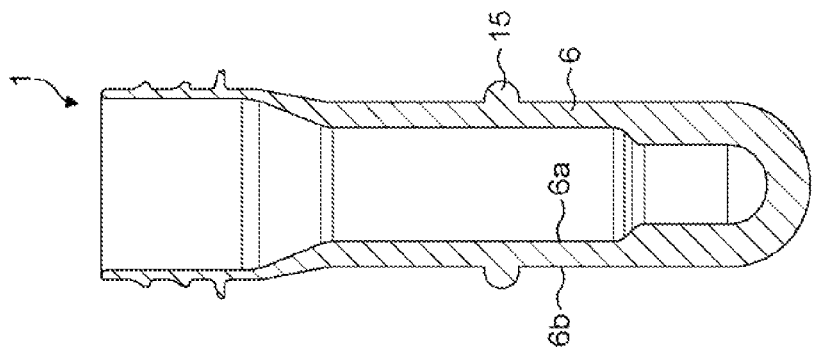
FIG. 15 shows a vertical cross-section of a seventh embodiment of a preform according to the present invention.

FIG. 15 shows a cross-section of a seventh embodiment of a preform 1 according to the present invention. In this embodiment outer a horizontal rib 15 is provided. In addition to the embodiment as shown in FIG. 13, in this preform additionally a step 14 is provided. Such a step can be combined with any number and type of inner horizontal ribs and/or with any type of outer ribs.

According to a preferred embodiment of the present invention, the side wall has an overall constant wall thickness. The ribs are only provided on several parts of the side wall 6, so that there are no steps within the side wall 6 of the preform.

Specifically, in the case of horizontal ribs as shown in FIGS. 13 and 14, there are provided no steps and the ribs are undercut, so that a constant wall thickness is achieved. However, the provision of steps is also possible, as shown in FIG. 15, where the outer ribs 15 are also undercut.

Figure 18:
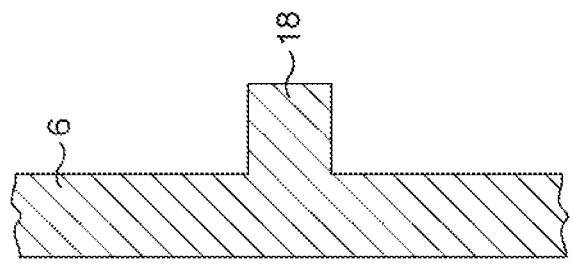
FIGS. 16 to 18 show different shapes of a horizontal rib within a preform according to the present invention.
Figure 17:
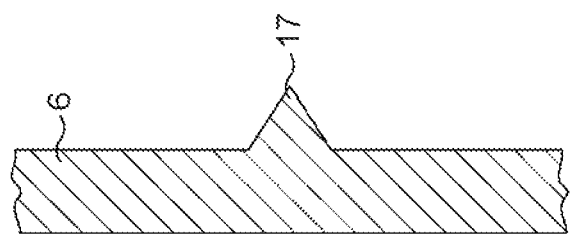
Figure 16:
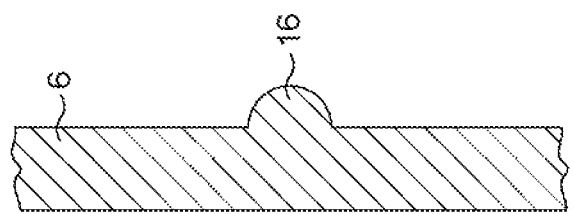

In FIGS. 16 to 18 different illustration of possible shapes of inner horizontal or any type of vertical ribs are shown. Each of the FIGS. 16 to 18 hereby shows a cross-section of the side wall 6 of a preform according to the present invention in such a way, that the cross-section of the rib can be seen.

The ribs as shown in FIGS. 16 to 18 can be provided on the inside 6a or on the outside 6b or both of the side wall 6. As shown in FIG. 16 the rib 16 has a half-circular cross-section. More generally, as rib there can be provided a roundish rib 16.

As shown in FIG. 17 there can also be provided a triangular rib 17 having a triangular cross-section. The triangle can hereby be equilateral, equal-sided or have sides with different lengths. Further, the corners of the triangle can be rounded in a convex or concave shape.

As ribs also rectangular ribs 18 as shown in FIG. 18 can be provided. Also any other cross-section of ribs basing on an elliptical, trapezoidal or other cross-sections is possible.

The above described possible cross-sections of ribs apply to any kind of rib, i.e. horizontal, vertical, diagonal or any other direction.

Figure 19:
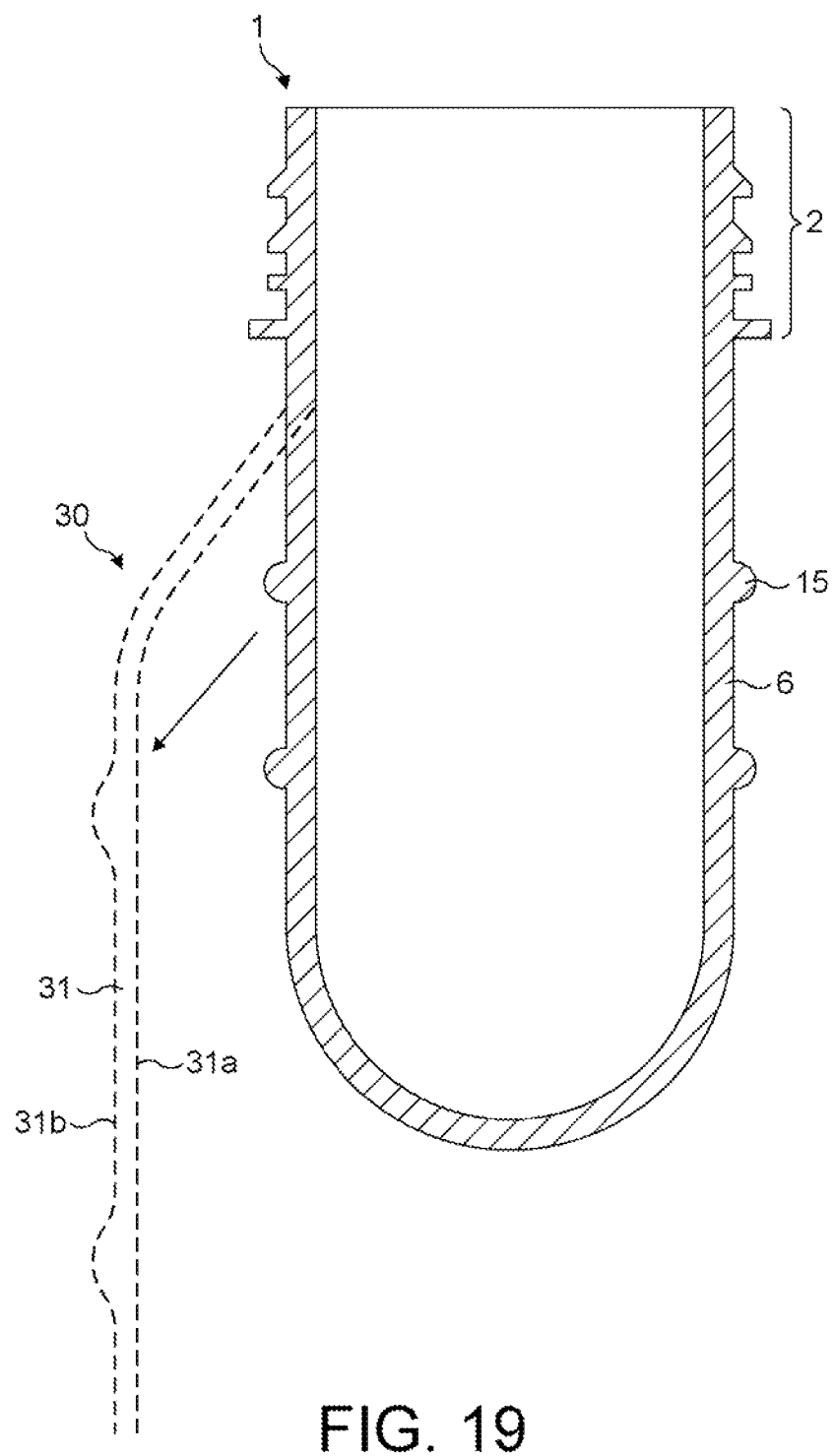
FIG. 19 shows a horizontal cross-section of a further embodiment of a preform and schematically the form of the resulting blow-moulded container.

FIG. 19 shows a cross-section of a preform having outer horizontal ribs 15 according to the present invention. Also shown in FIG. 19 is a part 30 of a final container blow-molded from such a preform 1.

As can be seen the final container in this case comprises a side wall 31 having a substantially flat outer side 31b and an inner side 31a having smoothed outer ribs 34. By using ribs which are already provided within the preform instead of attaching ribs during the blow-molding process to the container, a very smooth and substantially continuous inner surface can be achieved.

The possibility of providing inner ribs 34 on the final container further is only possible when providing a preform with inner ribs 14. A preform and a corresponding container further has the advantage, that no protrusions will be present on the outer side, so that labeling applications are simplified. Labeling is improved since less problems with wrinkles or witness lines occur. This also makes the appearance of the final container more aesthetic.

In FIGS. 20A and 20B, different possibilities of positioning ribs according to the present invention are shown. In these figures schematically a preform 1 is shown and the neck portion 2 is also schematically indicated. As already explained, on the neck portion 2 no ribs or grooves are shown in the figures, however ribs and/or grooves can also be provided on the neck portion 2.

FIG. 20A shows an embodiment with vertical ribs 40 extending along the complete vertical length of the side wall from the neck portion 2 to the bottom 7.

FIG. 20B shows an embodiment with vertical ribs 41, which are extending partially along the vertical length of the side wall. The ribs 41 can extend along an upper part of the side wall 6 starting from the neck portion 2, can extend along a lower part of the side wall 6 starting from the bottom or can extend in a middle part of the side wall 6 and being spaced apart from the neck portion 2 as well as from the bottom 7.

The vertical ribs 40, 41 as shown in FIGS. 20A and 20B can be provided on the inner side of the wall 6 and/or on the outer side of the wall 6.

FIG. 20C shows an embodiment with outer horizontal ribs 42 extending along the complete circumferential direction of the side wall 6.

FIG. 20D shows an embodiment with outer horizontal ribs 43 extending only partially along the circumferential direction of the side wall 6.

Figure 21:
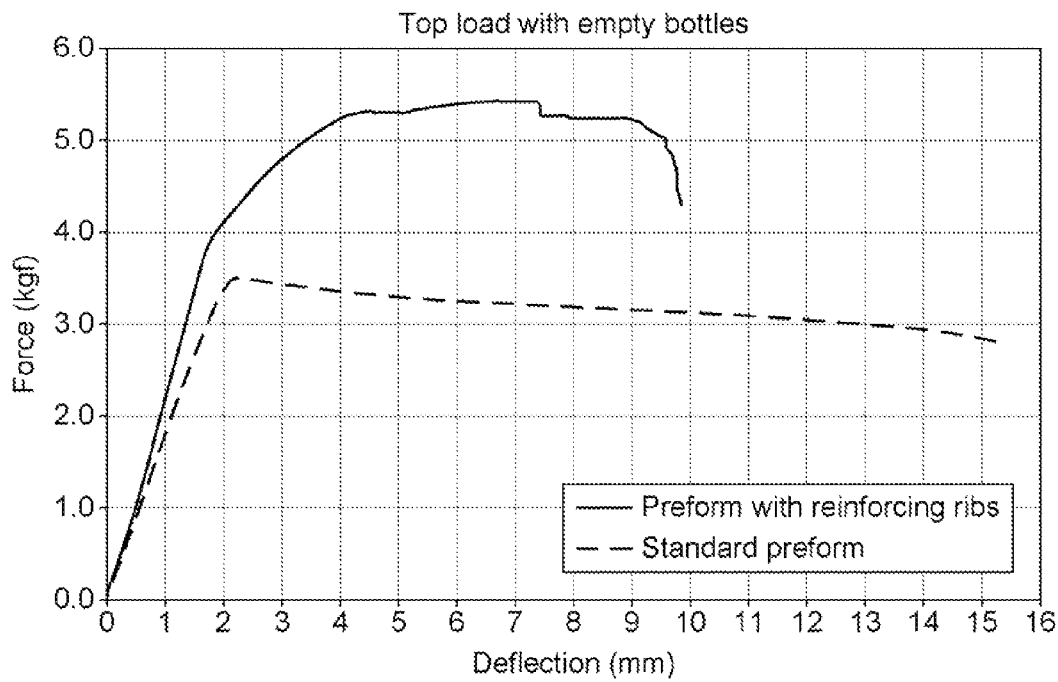
FIGS. 21 and 22 show the correlation between the top-load force and the deflection for a container blow-moulded from a standard preform and a preform according to the present invention.
Figure 22:
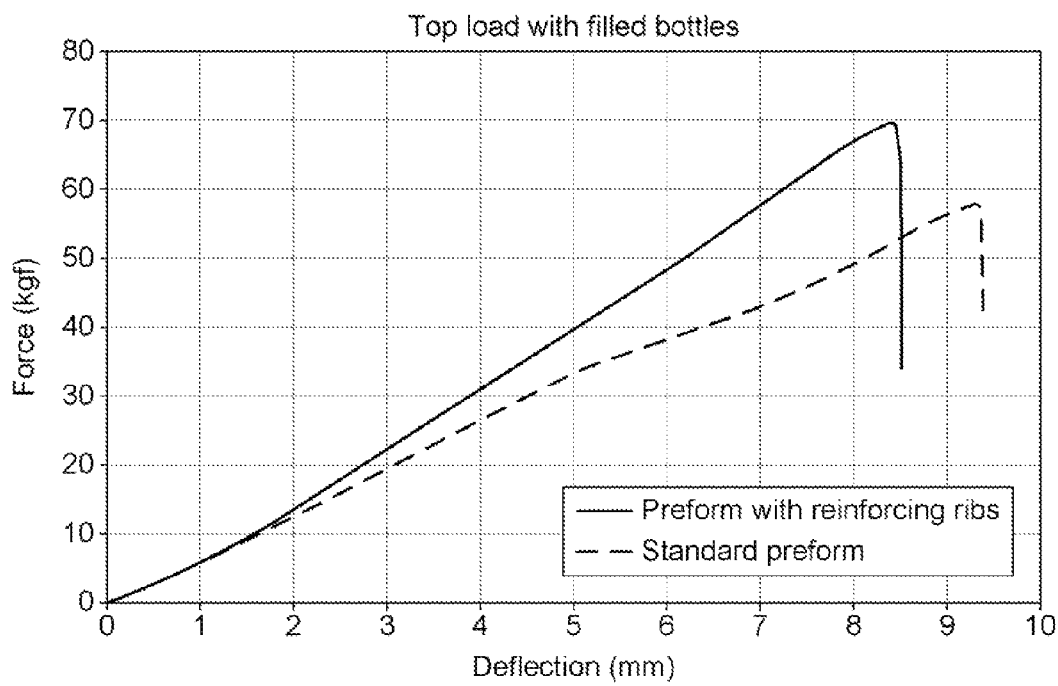

The advantages of the present invention will further become apparent from the diagrams in FIGS. 21 and 22. The diagrams on the Y-axis show the force in kgf, which was exerted on the top of a bottle which was produced from a preform having vertical ribs according to the present invention. On the X-axis the deflection of the bottle in mm is shown.

Hereby, FIGS. 21 and 22 shows the comparison between a bottle produced from a preform with reinforcing ribs and a bottle produced from a standard preform of the same material weight. The graph shown with dashed lines is the one resulting from the standard preform. The diagram in FIG. 21 hereby shows the case of measuring the top load with empty bottles and FIG. 22 shows the case of measuring the top load with filled bottles.

As can be seen from both diagrams the bottles produced from the preforms with reinforcing ribs according to the present invention are able to withstand higher forces before deflection occurs. On the other hand, due to the reinforcing ribs the rest of the wall of the bottle can be made thinner, so that the bottle as a whole can have less weight and needed material.

Figure 23:
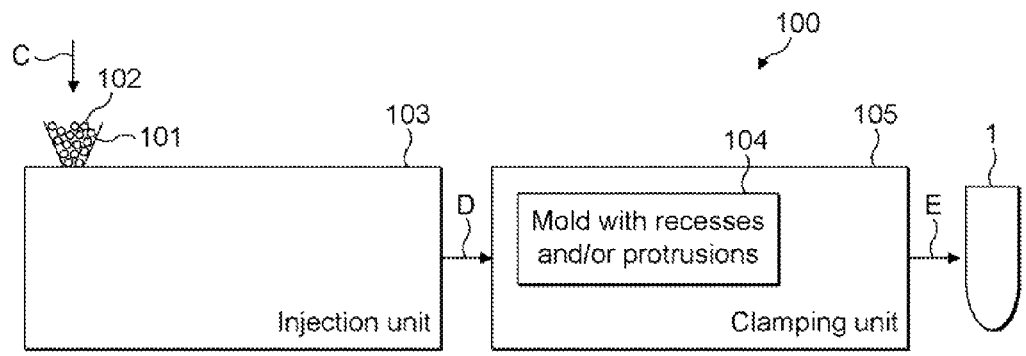
FIG. 23 schematically shows a block diagram of a injection-moulding machine.

A device for injection molding is schematically shown in FIG. 23.

An injection-molding machine 100 comprises generally an injection unit 103 and a clamping unit 105. The injection unit 103 usually includes a hopper 101 into which the molding material 102 is filled as indicated with arrow C. The injection unit 103 is only schematically shown in FIG. 22 since it comprises all units usually comprised within an injection unit depending on the type of injection-molding machine used, for example an injection ram, a screw, a barrel, a heater or the like. The injection unit 103 melts the material provides the material to the clamping unit 105, as schematically indicated with arrow D.

The clamping unit 105 comprises a specific mold 104 with recesses and/or protrusions which allows to provide a preform 1 with ribs and/or grooves according to the present invention. Also the clamping unit 105 comprises all necessary features which are usually comprised within a clamping unit. The specific feature is that the mold 104 is adapted to produce preforms with a thinner wall and with ribs, which allow to use less material, as previously explained. From the clamping unit then the preform 1 according to the present invention is output, as schematically indicated with arrow E.

Figure 24:
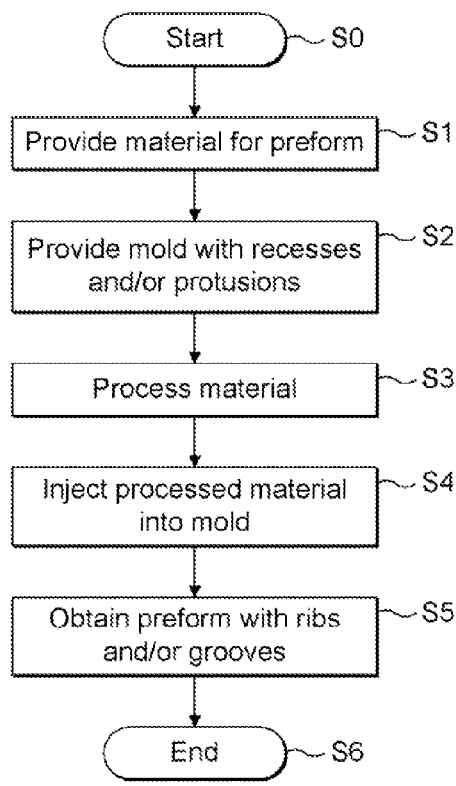
FIG. 24 is a flow chart showing the process steps for producing a preform according to the present invention and FIG. 25 is a flow chart showing the process steps for producing a container according to the present invention.

Now the general steps for producing a preform will be shown with reference to the flow chart in FIG. 24.

The process starts in step S0. In step S1 the material for the preform is provided.

The material for the preform hereby is a plastic, preferably a thermoplastic. The thermoplastic is chosen from the group consisting of polyethylene terephthalates, polypropylenes, polyethylenes, polycarbonates, polystyrenes, polylactic acids, polyvinyl chlorides and combinations thereof. In the preferred embodiment, it is PET.

In step S2 the mold with recesses and/or protrusions is provided. In step S3 the material is processed for example by the injection unit 103. In step S4 the processed material is injected into the mold 104. After operation of the clamping unit 105 then in step S5 the preform 1 with ribs and/or grooves is obtained. The process ends in step S6.

Figure 25:
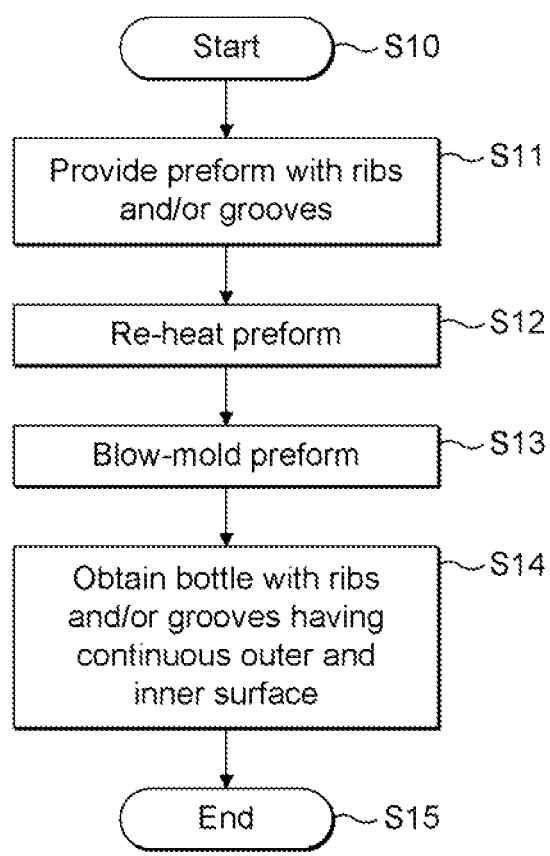

Now the process of blow-molding a container from a preform is schematically explained with reference to FIG. 25. The process starts in step S10. In step S11 the inventive preform with ribs and/or grooves is provided and reheated in step S12. In the next step S13 the preform is inserted into the blow-mold and the preform is blow-molded, thereby obtaining in step S14 the final container, preferably a bottle, having ribs and/or grooves and having a continuous outer and inner surface. The process ends in step S15.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A plastic preform for a container, comprising at least one elongated structure selected from the group consisting of an elongated protrusion and an elongated groove, the elongated structure extending in a direction parallel to the longitudinal axis of the preform and provided on the inner side of a side wall of the preform, and the thickness of the side wall of the preform constantly varies along the horizontal direction of the side wall of the preform and is constant along the longitudinal axis of the preform.

2. The preform according to claim 1, wherein the elongated structure comprises a protrusion that extends in a direction parallel to the longitudinal axis of the preform.

3. The preform according to claim 2, wherein the protrusion is provided on the inner side of the side wall of the preform.

4. The preform according to claim 1, wherein the elongated structure comprises an additional protrusion that extends in a circumferential direction of the preform on the outer side of the side wall of the preform.

5. The preform according to claim 1, wherein the elongated structure comprises a protrusion that has a cross-sectional shape selected from the group consisting of roundish, triangular and rectangular.

6. The preform according to claim 1, comprising at least two protrusions being equidistant to each other and at least two grooves being equidistant to each other.

7. The preform according to claim 1 made from a thermoplastic material, wherein the thermoplastic is selected from the group consisting of polyethylene terephthalates, polypropylenes, polyethylenes, polycarbonates, polystyrenes, polylactic acids, polyvinyl chlorides and combinations thereof.

8. A plastic perform for a container, comprising at least one elongated structure selected from the group consisting of an elongated protrusion and an elongated groove, the elongated structure extending in a direction parallel to the longitudinal axis of the preform and provided on the inner side of a side wall of the preform, the thickness of the side wall of the preform constantly varies along the horizontal direction of the side wall of the preform and is constant along the longitudinal axis of the preform, at the elongated protrusions the side wall of the preform has a maximum wall thickness $d1$ in the horizontal direction, in the elongated grooves the side wall of the preform has a minimum wall thickness $d0$ in the horizontal direction, and the thickness of the side wall in the horizontal direction is constantly increasing or decreasing between the minimum wall thickness $d0$ and the maximum wall thickness $d1$.

9. The preform according to claim 1, wherein the elongated structure comprises a groove that extends in a direction parallel to the longitudinal axis of the perform.

10. The preform according to claim 9, wherein the groove is provided on the inner side of the side wall of the perform.

11. The preform according to claim 1, wherein the inner surface of the side wall forms a hexagon in a plane perpendicular to the longitudinal axis.

12. The preform according to claim 1, wherein the elongated structure comprises elongated protrusions between which the inner surface of the side wall curves outward in a plane perpendicular to the longitudinal axis.

* * * * *